United States Patent
Park et al.

(10) Patent No.: US 9,712,295 B2
(45) Date of Patent: Jul. 18, 2017

(54) METHOD AND DEVICE FOR INTER-CLUSTER COOPERATIVE COMMUNICATION IN MOBILE COMMUNICATION SYSTEM

(71) Applicant: Samsung Electronics Co., Ltd., Gyeonggi-do (KR)

(72) Inventors: Sung-Woo Park, Seoul (KR); Nam-Koo Kang, Gyeonggi-do (KR); Hee-Won Kang, Gyeonggi-do (KR); Jae-Yun Ko, Gyeonggi-do (KR)

(73) Assignee: Samsung Electronics Co., Ltd., Suwon-si, Gyeonggi-do (KR)

( * ) Notice: Subject to any disclaimer, the term of this patent is extended or adjusted under 35 U.S.C. 154(b) by 71 days.

(21) Appl. No.: 14/385,493

(22) PCT Filed: Mar. 13, 2013

(86) PCT No.: PCT/KR2013/002009
§ 371 (c)(1),
(2) Date: Sep. 15, 2014

(87) PCT Pub. No.: WO2013/137640
PCT Pub. Date: Sep. 19, 2013

(65) Prior Publication Data
US 2015/0092687 A1    Apr. 2, 2015

(30) Foreign Application Priority Data
Mar. 13, 2012   (KR) .................. 10-2012-0025446

(51) Int. Cl.
*H04L 5/00* (2006.01)
*H04W 16/24* (2009.01)
*H04B 7/024* (2017.01)

(52) U.S. Cl.
CPC .......... *H04L 5/0035* (2013.01); *H04L 5/0092* (2013.01); *H04B 7/024* (2013.01);
(Continued)

(58) Field of Classification Search
None
See application file for complete search history.

(56) References Cited

U.S. PATENT DOCUMENTS

2007/0177631 A1* 8/2007 Popovic .................... H04J 4/00
370/478
2007/0254662 A1* 11/2007 Khan .................... H04L 1/1685
455/436
(Continued)

FOREIGN PATENT DOCUMENTS

JP      2012-034053      2/2012
KR   10-2009-0072659     7/2009
(Continued)

OTHER PUBLICATIONS

International Search Report dated Jun. 26, 2013 in connection with International Patent Application No. PCT/KR2013/002009, 5 pages.
(Continued)

*Primary Examiner* — Chi H Pham
*Assistant Examiner* — Soon-Dong D Hyun

(57) ABSTRACT

The present invention relates to a method and device for inter-cluster cooperative communication in a mobile communication system. A central unit operating method for inter-cluster cooperative communication in a mobile communication system comprises processes comprising: a process of receiving channel data from serving sectors in a serving cluster; a process of respectively receiving the magnitude of change of a target function for scheduling depending on whether the serving sector is blank, from neighboring sectors in neighboring clusters of the serving
(Continued)

cluster; and a process of determining the blank pattern of the serving cluster, by using the channel data received from the serving sectors, and the magnitude of change of the target function received from the neighboring sectors in neighboring clusters.

16 Claims, 6 Drawing Sheets

(52) U.S. Cl.
CPC .......... *H04L 5/0075* (2013.01); *H04L 5/0076* (2013.01); *H04L 5/0082* (2013.01); *H04W 16/24* (2013.01)

(56) References Cited

U.S. PATENT DOCUMENTS

| | | | | |
|---|---|---|---|---|
| 2009/0022235 A1* | 1/2009 | Zhang | ................... | H04L 5/0007 375/260 |
| 2009/0245197 A1* | 10/2009 | Ma | ....................... | H04L 5/0046 370/330 |
| 2010/0027502 A1* | 2/2010 | Chen | .................... | H04L 5/0007 370/330 |
| 2012/0113843 A1* | 5/2012 | Watfa | ................ | H04W 72/1289 370/252 |
| 2013/0084865 A1* | 4/2013 | Agrawal | ........... | H04W 36/0083 455/436 |
| 2014/0179320 A1* | 6/2014 | Jang | ...................... | H04W 36/30 455/436 |
| 2014/0204790 A1* | 7/2014 | Li | ......................... | H04L 5/0035 370/252 |
| 2014/0254512 A1* | 9/2014 | Ron | ......................... | H04L 1/20 370/329 |

FOREIGN PATENT DOCUMENTS

| | | |
|---|---|---|
| KR | 10-2010-0064424 | 6/2010 |
| KR | 10-2011-0045936 | 5/2011 |
| KR | 10-2011-0072110 | 6/2011 |
| KR | 10-2012-0015977 | 2/2012 |
| KR | 10-2012-0018120 | 2/2012 |

OTHER PUBLICATIONS

Written Opinion of International Searching Authority dated Jun. 26, 2013 in connection with International Patent Application No. PCT/KR2013/002009, 5 pages.

* cited by examiner

METHOD AND DEVICE FOR INTER-CLUSTER COOPERATIVE COMMUNICATION IN MOBILE COMMUNICATION SYSTEM

CROSS-REFERENCE TO RELATED APPLICATION(S)

The present application claims priority under 35 U.S.C. §365 to International Patent Application No. PCT/KR2013/002009 filed Mar. 13, 2013, entitled "METHOD AND DEVICE FOR INTER-CLUSTER COOPERATIVE COMMUNICATION IN MOBILE COMMUNICATION SYSTEM", International Patent Application No. PCT/KR2013/002009 claims priority under 35 U.S.C. §365 and/or 35 U.S.C. §119(a) to Korean Patent Application No. 10-2012-0025446 filed Mar. 13, 2012, both of which are incorporated herein by reference into the present disclosure as if fully set forth herein.

TECHNICAL FIELD OF THE INVENTION

The present invention relates generally to a mobile communication system. More particularly, the present invention relates to a method and a device for inter-cluster cooperative communication in a mobile communication system.

BACKGROUND OF THE INVENTION

To improve performance of advanced communication systems, various research institutions and standardization groups provide various technologies. For example, recent attention focuses on a multi-carrier modulation scheme Orthogonal Frequency Division Multiplexing (OFDM) which transmits data by dividing a frequency band of high data rate into a plurality of orthogonal subcarriers.

Meanwhile, a wireless communication system has a cell structure for the sake of efficient system configuration. The cell indicates is a subdivided area to efficiently utilize the frequency. In general, a base station is installed at the center of the cell to relay a terminal, and the cell indicates service coverage provided by one base station.

When neighboring cells of the OFDM/OFDMA system use the same subcarrier in a multi-cell environment, this can cause interference to users. This is referred to as inter-cell interference. Particularly, the inter-cell interference becomes a great problem to the terminal near a cell boundary. In downlink, the terminal in the cell boundary is greatly interfered by the neighboring cell. In uplink, the terminal in the cell boundary not only imposes strong interference on the neighboring cell but also suffers from the low data rate due to path loss in a serving cell.

To mitigate the inter-cell interference, the neighboring cells can use different subcarriers. However, radio resources usable by one base station reduce.

Alternatively, a multi-cell cooperative scheme is suggested to reduce the inter-cell interference in the multi-cell environment. The multi-cell cooperative scheme can enhance communication performance of the terminal near the cell boundary. The multi-cell cooperative scheme is performed based on one cluster or cloud including a plurality of cells. Each cluster or the cloud is controlled by a central unit.

FIG. 1 depicts conventional clusters.

Referring to FIG. 1, multiple cells are grouped to form one cluster, and a wireless communication system includes a plurality of clusters.

A Central Unit (CU) of each cluster dynamically determines whether to transmit data of the cells in the cluster per Transmission Time Interval (TTI), and aborts the transmission of other cell when one cell transmits data so as to control the inter-cell interference in the cluster. Hereafter, an interval where the other cell does not transmit data is referred to as a blank, and the blank of the cells in the cluster is referred to as a blank pattern. That is, the CU determines the blank of the cells of the most adequate cluster per TTI using channel condition of all of the terminals in the cluster. Each cell in the cluster performs scheduling using the blanks of the cell and the neighboring cells and the channel condition.

The number of the cells controlled by one CU is limited. That is, the whole system cannot be grouped into a single cluster and accordingly is divided into the multiple clusters. In this regard, a method for controlling inter-cluster interference using the inter-cluster distributed cooperation is required.

SUMMARY OF THE INVENTION

To address the above-discussed deficiencies of the prior art, it is a primary aspect of the present invention to provide a method and a device for inter-cluster cooperative communication in a mobile communication system.

Another aspect of the present invention is to provide a method and a device for minimizing inter-cluster interference in a mobile communication system.

According to one aspect of the present invention, a central unit operating method for inter-cluster cooperative communication in a mobile communication system includes receiving channel information from serving sectors in a serving cluster; receiving the magnitude of change of a target function for scheduling depending on whether the serving sector is blank, respectively from neighboring sectors in neighboring clusters of the serving cluster; and determining a blank pattern of the serving cluster using the channel information received from the serving sectors and the magnitude of change of the target function received from the neighboring sectors in the neighboring clusters, wherein the magnitude of change of the target function for the scheduling is the magnitude of change of a target function of second neighboring sectors in the neighboring clusters of the serving sector when the serving sector in the serving cluster is serviced.

According to another aspect of the present invention, a base station operating method for inter-cluster cooperative communication in a mobile communication system includes providing channel information to a central unit; receiving blank pattern data of the serving sector and neighboring sectors in a neighboring cluster, from the central unit; and performing scheduling based on the blank pattern data of the serving sector and sectors in the neighboring cluster, wherein the scheduling is determined by considering a total target function change magnitude of the neighboring sectors in the neighboring clusters affecting the serving sector.

According to yet another aspect of the present invention, a central unit for inter-cluster cooperative communication in a communication system includes a controller for receiving channel information from serving sectors in a serving cluster, receiving the magnitude of change of a target function for scheduling depending on whether the serving sector is blank, respectively from neighboring sectors in neighboring clusters of the serving cluster, and determining a blank pattern of the serving cluster using the channel information received from the serving sectors and the magnitude of change of the target function received from the neighboring sectors in the neighboring clusters, wherein the magnitude of change of the target function for the scheduling is the magnitude of change of a target function of second neighboring sectors in the neighboring clusters of the serving sector when the serving sector in the serving cluster is serviced.

According to still another aspect of the present invention, a base station for inter-cluster cooperative communication in a mobile communication system includes a transmitter for providing channel information to a central unit; a receiver for receiving blank pattern data of the serving sector and neighboring sectors in a neighboring cluster, from the central unit; and a scheduler for performing scheduling based on the blank pattern data of the serving sector and sectors in the neighboring cluster, wherein the scheduling is determined by considering a total target function change magnitude of the neighboring sectors in the neighboring clusters affecting the serving sector.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features, and advantages of certain exemplary embodiments of the present invention will be more apparent from the following description taken in conjunction with the accompanying drawings, in which.

Throughout the drawings, like reference numerals will be understood to refer to like parts, components and structures.

DETAILED DESCRIPTION OF THE INVENTION

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. In addition, descriptions of well-known functions and constructions may be omitted for clarity and conciseness.

The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present invention is provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

By the term "substantially" it is meant that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

Exemplary embodiments of the present invention provide a method and a device for inter-cluster cooperative communication in a mobile communication system.

Figure 1:
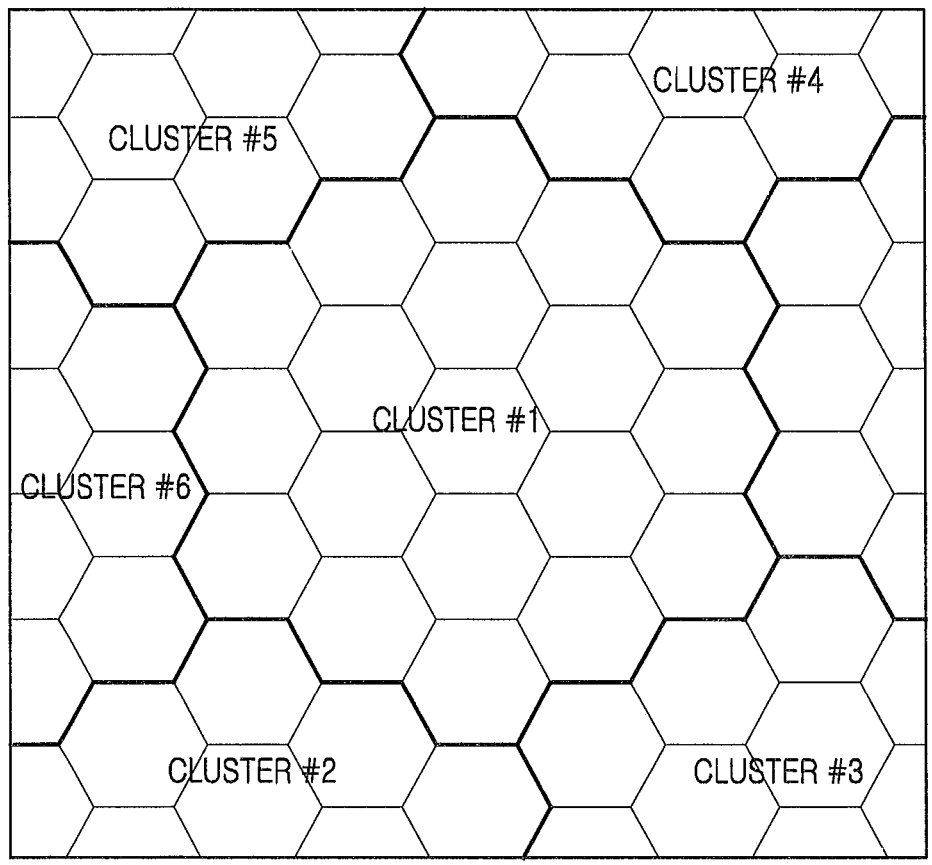
FIG. 1 illustrates conventional clusters.
Figure 2A:
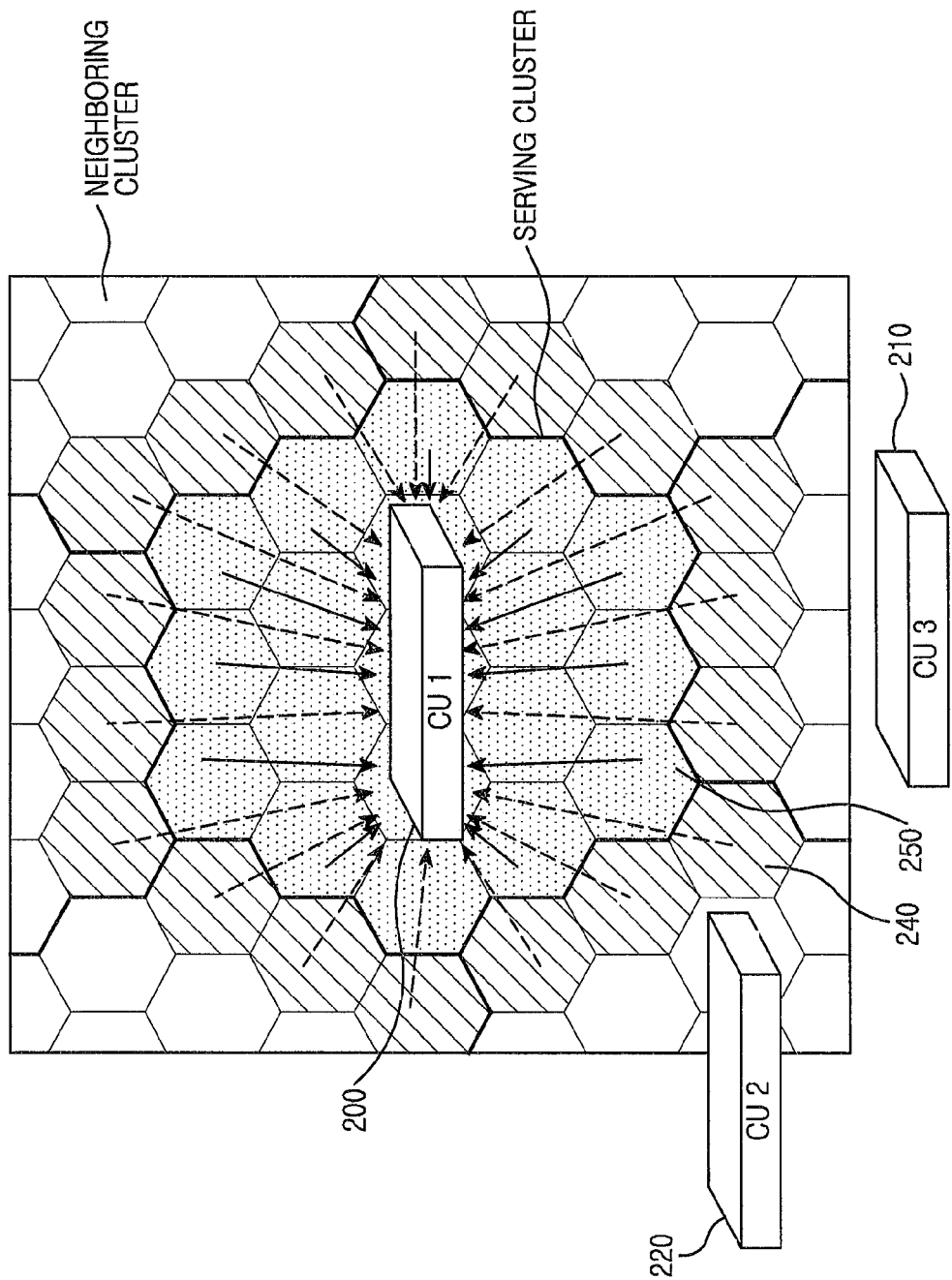
FIGS. 2A through 2C illustrate a scenario for mitigating inter-cluster interference in a mobile communication system according to an exemplary embodiment of the present invention.
Figure 2B:
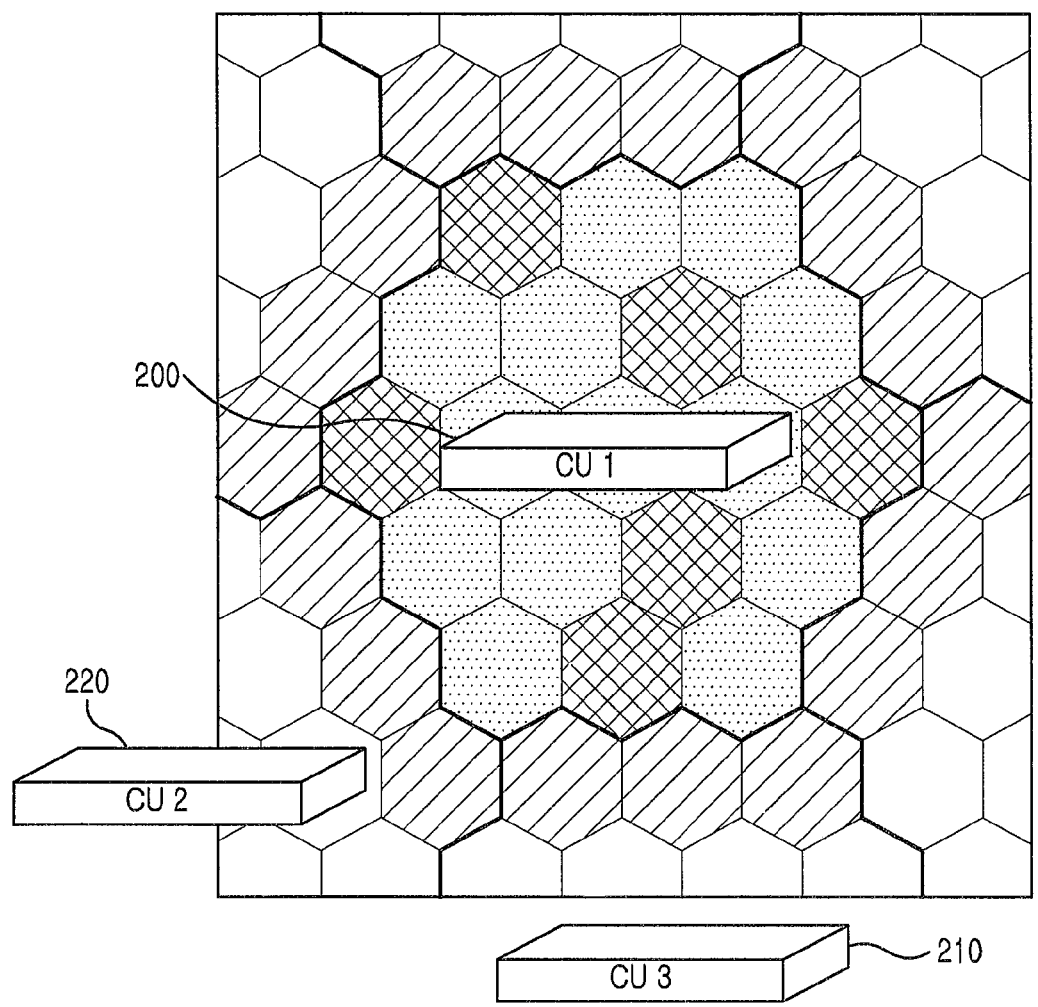
Figure 2C:
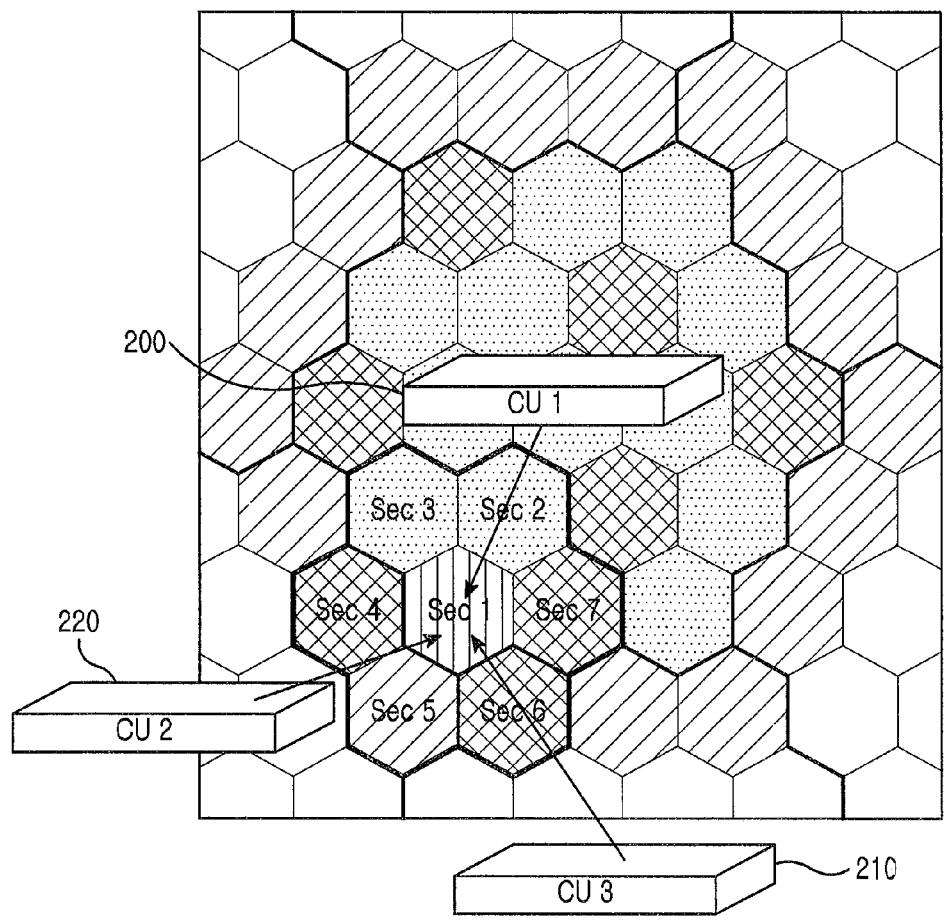

FIGS. 2A through 2C illustrate a scenario for mitigating inter-cluster interference in a mobile communication system according to an exemplary embodiment of the present invention. Herein, it is provided that one cluster includes 20 sectors or cells and the mobile communication system includes a plurality of such clusters. Each cluster includes a Central Unit (CU) for controlling inter-cell or inter-sector interference in the cluster and determining a blank pattern for the cell/sector in the cluster. The blank pattern indicates a blank of the cells in the cluster, and the blank indicates no transmission interval of other cell when one cell transmits data. The CU resides in the corresponding sector or cell per cluster. It is apparent that, depending on the implementation, the cluster can include 20 or more cells or sectors, or 20 or less cells or sectors.

Hereafter, the cluster which performs the service is referred to as a serving cluster, and a cluster adjacent to the serving cluster is referred to as a neighboring cluster.

Referring to FIG. 2A, a corresponding CU1 200 in the serving cluster receives data for determining an instantaneous data rate of terminals in a sector m, from the sector m 250 in the serving cluster. For example, the sector m 250 transmits channel information of the serving sector and the neighboring sectors of the terminal to the CU1 200. Herein, the channel information of the serving sector and the neighboring sectors can be determined in a manner that the terminal measures and reports a pilot signal of a downlink channel to the serving sector, or the serving sector receives a sounding signal of an uplink channel from the terminal.

The sector m 250 can be any sector/cells in the serving cluster, or boundary sectors or boundary cells (e.g., a sector k 240) of the serving clusters adjacent to a neighboring cluster of the serving cluster.

Also, the CU1 200 receives inter-cluster cooperation data from the sector k of the neighboring cluster of the serving cluster. The inter-cluster cooperation data can be provided from the sector k to the CU1 200 of the serving cluster via a backbone, or directly from the sector k to the CU1 200 of the serving cluster.

The inter-cluster cooperation data is a magnitude of change of whole utility of the sector k 240 according to on/off (e.g., the blank) of the sector m 250, and the utility is a target function maximized by a scheduler of the base station. The target function maximized by the scheduler of the base station can include capacity, fairness, or Proportional Fairness (PF) considering the capacity or the fairness. The present invention is not limited to those three target functions and can apply any other target function.

Referring to FIG. 2B, the CU1 200 determines the on/off of the sectors in its controlling cluster according to a predefined rule. That is, the CU1 200 determines the blank for the sectors in the cluster by selecting one of the blank patterns of all cases. The blank pattern of the serving cluster is determined semi-statically. The present invention does not limit the method for determining the blank pattern, and can apply any other blank pattern determining method.

Referring to FIG. 2C, the CU1 200 transmits blank data of the corresponding sector m managed by itself, to the corresponding sector m, receives the blank data of the corresponding sector k near the sector m controlled by the CU1 200 from CU2 210 and CU3 220 of the neighboring clusters, and transmits to the corresponding sector m. Also, the CU1 200 provides the blank data of the corresponding sector m of the serving cluster adjacent to the sector k of the neighboring cluster, to the CU2 210 and the CU3 220 of the neighboring clusters.

According to the implementation, the CU1 200 transmits blank pattern data of every sector or cell controlled, to the corresponding sector m. The CU2 210 and the CU3 220 of the neighboring clusters may directly transmit the blank data of the sector k near the neighboring sector m, to the neighboring sector m without transmitting the blank data of the sector k near the neighboring sector m.

For example, the CU1 200 provides the blank data of the sectors 1, 2, 3 and 7 to the sector 1, and the CU1 provides the blank data of the sectors 4, 5, and 6 of the neighboring clusters received from the CU2 210 and the CU3 220 of the neighboring clusters, to the sector 1.

Alternatively, the CU1 provides the blank data of the sectors 1, 2, 3, and 7 to the sector 1, the CU2 220 of the neighboring clusters provides the blank data of the sectors 4 and 5 of the neighboring cluster to the sector 1 of the CU1 200, and the CU3 210 of the neighboring clusters provides the blank data of the sector 6 of the neighboring cluster to the sector 1 of the CU1 200.

Figure 3:
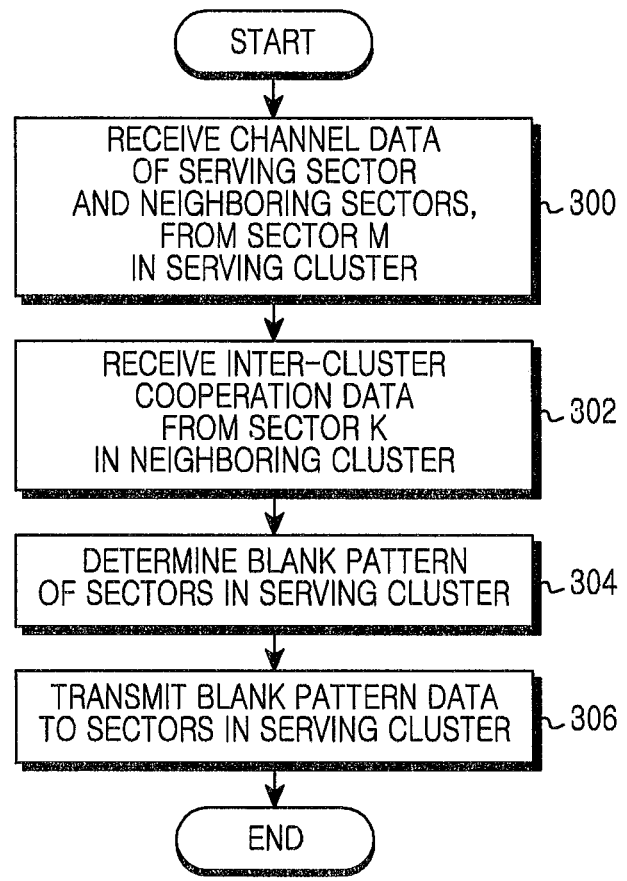
FIG. 3 illustrates operations of a central unit for controlling the inter-cluster interference in the mobile communication system according to an exemplary embodiment of the present invention.

FIG. 3 is a flowchart of operations of the CU for controlling the inter-cluster interference in the mobile communication system according to an exemplary embodiment of the present invention.

Referring to FIG. 3, the CU receives the channel information of the serving sector and the neighboring sectors from the sector m in the serving cluster in step 300.

In step 302, the CU receives inter-cluster cooperation data, that is, the utility change magnitude of the sector k when the sector m (m=1, 2, . . . ) in the serving cluster switches from OFF (blank) to ON (no-blank), from the sector k in the neighboring cluster or the neighboring CU. The utility is the target function maximized by the base station scheduler, and can be given by the utility $U_{u(k)}=X_{u(k)}$ when the capacity is maximized, and the utility $U_{u(k)}=\log(X_{u(k)})$ in terms of the PF. Herein, log can be given by a ratio of a current data rate to an average data rate.

$U_{u(k)}$ is the utility of the terminal u(k) of the sector k, and $X_{u(k)}$ is the average data rate transmitted to the terminal u(k). m is a sector index in the serving cluster, k is a sector index in the interfering cluster, $N_{user(k)}$ is the number of active terminals in the sector k, and u(k) is an index (=1, . . . , $N_{user(k)}$) of the terminals in the sector k.

Herein, the utility change magnitude in terms of the PF can be given by Equation 1.

$$\frac{\partial U_k}{\partial \phi_m} = \frac{\partial}{\partial \phi_m} \sum_{u(k)=1}^{N_{user}(k)} \log(X_{u(k)}) =$$

$$\sum_{u(k)=1}^{N_{user}(k)} \frac{1}{X_{u(k)}} \frac{\partial X_{u(k)}}{\partial \phi_m} \sum_{u(k)=1}^{N_{user}(k)} \left( \frac{1}{X_{u(k)}} \frac{\partial}{\partial \phi_m} \frac{1}{T} \sum_{t=1}^{T} \varphi_{u(t)}^{t} R_{u(t)}^{t} \right)$$

$$\varphi_{u(t)}^{t} = 0, \text{ or } 1$$

$$\frac{\partial U_k}{\partial \phi_m} = \frac{\partial}{\partial \phi_m} \sum_{u(k)=1}^{N_{user}(k)} \log(X_{u(k)}) = \quad (1)$$

$$\sum_{u(k)=1}^{N_{user}(k)} \frac{1}{X_{u(k)}} \frac{\partial X_{u(k)}}{\partial \phi_m} = \sum_{u(k)=1}^{N_{user}(k)} \left( \frac{1}{X_{u(k)}} \frac{\partial}{\partial \phi_m} \frac{1}{T} \sum_{t=1}^{T} \varphi_{u(t)}^{t} R_{u(t)}^{t} \right) =$$

$$\frac{1}{X_{u(k)}} \frac{\partial R_{u_{sel}(k)}}{\partial \phi_m} \Rightarrow \left( \frac{R_{m\text{-}on, u_{sel}(k)} - R_{m\text{-}off, u_{sel}(k)}}{X_{u_{sel}(k)}} \right)$$

$R_{m\text{-}on,u_{sel}(k)}$ and $R_{m\text{-}off,u_{sel}(k)}$ can be given by Equation 2.

$$\begin{cases} R_{m\text{-}on,u_{sel}(k)} = \dfrac{S_{u(k)}^{k}}{\sum\limits_{l \in Intra} I_{u(k)}^{l} + \sum\limits_{o \in Intra} I_{u(k)}^{o} + N} \\ R_{m\text{-}off,u_{sel}(k)} = \dfrac{S_{u(k)}^{k}}{\sum\limits_{l \in Intra} I_{u(k)}^{l} + \sum\limits_{o \in Intra} I_{u(k)}^{o} - I_{u(k)}^{m} + N} \end{cases} \quad (2)$$

Here, u(k) is the entire utility (the sum of the utility of all of the users in the sector k) of the sector k, $\phi_m$ is current on/off data (on=1, off=0) of the sector m, $\phi_{u(t)}^{t}$ is schedule result notification (scheduled=1, otherwise=0) of the terminal u(k) in the sector k at the time t, $R_{u(t)}^{t}$ is the instantaneous data rate of the terminal u(k) in the sector k at the time t, T is a time duration for averaging the instantaneous data rates, $u_{sel}(k)$ is the terminal index currently scheduled in the sector k, $R_{u_{sel}(k)}$ is the instantaneous data rate of the terminal currently scheduled in the sector k, $X_{u_{sel}(k)}$ is the average data rate of the terminal currently scheduled in the sector k, $R_{m\text{-}on,u_{sel}(k)}$ is the instantaneous data rate of the terminal currently scheduled in the sector k on the assumption that the sector m is on, $R_{m\text{-}off,u_{sel}(k)}$ is the instantaneous data rate of the terminal currently scheduled in the sector k on the assumption that the sector m is off, $S_{u(k)}^{k}$ is a power of a self signal received at the terminal u(k) from the sector k (the serving sector), $I_{u(k)}^{m}$ is a power of an interference signal received at the terminal u(k) from the sector m (the interfering sector), $$\sum_{l \in intra} I_{u(k)}^{l}$$

is the sum of the power of the interference signal of the sectors l inside the serving cluster, $$\sum_{o \in intra} I_{u(k)}^{o}$$

is the sum of the power of the interference signal of sectors o outside the serving cluster, N is a thermal noise, $R_{u(m)}^{Blank\ pattern}$ is the instantaneous data rate of the terminal u(k) in consideration of the blank pattern (on/off data) of the neighboring sectors in the sector m, and $\partial U_{OC}/\partial \phi_m$ is the utility change magnitude of the neighboring sectors when the sector m is on.

Next, the CU determines one of the blank patterns of all cases in step 304 and transmits the determined blank pattern in step 306. The blank pattern is determined semi-statically. Although it is not depicted, when receiving the blank pattern of the neighboring cluster or the blank data of some sectors from the other CU which controls the neighboring cluster, the CU transmits this to the sector m.

When the blank data and the inter-cluster cooperation data (e.g., the sector k (m=1, 2, ... ) in the neighboring cluster) of at least one sector m switches from OFF (blank) to ON (no-blank), the CU transmits the utility change magnitude of the sector m to the other CU which controls the neighboring cluster (not shown).

Next, the CU finishes this process.

Figure 4:
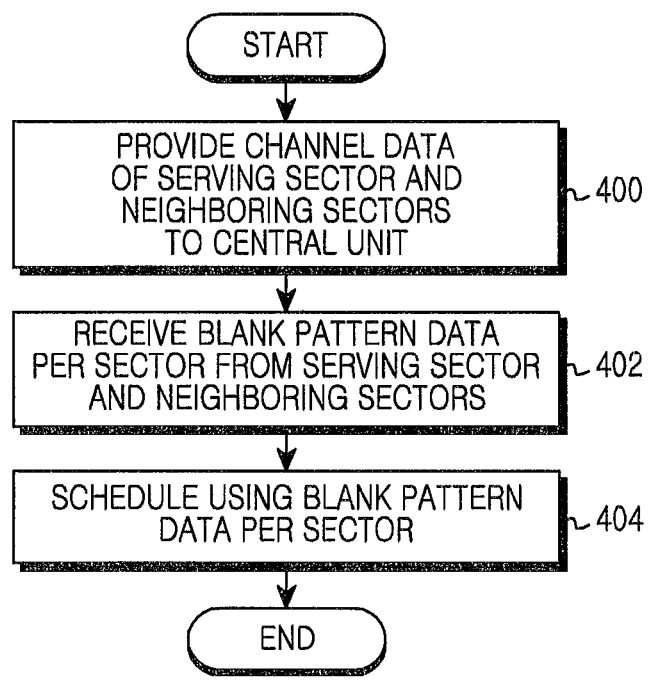
FIG. 4 illustrates operations of a base station for covering a sector to control the inter-cluster interference in the mobile communication system according to an exemplary embodiment of the present invention.

FIG. 4 is a flowchart of operations of the base station covering the sector to control the inter-cluster interference in the mobile communication system according to an exemplary embodiment of the present invention.

Referring to FIG. 4, the base station of the sector m provides the channel information of the serving sector m and the neighboring sectors to the CU in step 400.

In step 402, the base station of the sector m receives the blank pattern data per sector from the serving cluster and the neighboring clusters (see FIG. 2B).

In step 404, the base station of the sector m performs a predefined scheduling based on the blank pattern data per sector received from the serving cluster and the neighboring clusters and the utility change magnitude.

For example, the base station of the sector m calculates the sum of the utility change magnitude (that is, the inter-cluster cooperation data received from the sector k) of the neighboring sectors (k=1, 2, ... ) when the sector m in the serving cluster is on/off based on Equation 3, and determines a scheduling metric value per user using the sum of the utility change magnitude based on Equation 4.

$$\frac{\partial U_{OC}}{\partial \phi_m} = \sum_{k \in neighboring\ sectors\ outside\ the\ serving\ cluster} \frac{\partial U_k}{\partial \phi_m} \quad (3)$$

$$\text{scheduling metric} = \frac{\partial U_m}{\partial \phi_m} + \frac{\partial U_{OC}}{\partial \phi_m} \quad (4)$$

$$= \frac{R_{u(m)}^{Blank\ pattern}}{X_{u(m)}} + \frac{\partial U_{OC}}{\partial \phi_m}$$

Next, the CU finishes this process.

According to the implementation, the scheduling metric per user may be calculated in the CU and its result may be notified to the base station of the sector m.

The CU according to an exemplary embodiment of the present invention comprises an interface and a controller.

The interface receives the channel information of the serving sector and the neighboring sectors from the sector m in the serving cluster, or receives the inter-cluster cooperation data, that is, the utility change magnitude of the sector k when the sector m (m=1, 2, ... ) in the serving cluster switches from OFF (blank) to ON (no-blank), from the sector k (or the neighboring CU) in the neighboring cluster. The utility is the target function maximized by the base station scheduler, and can be given by the utility $U_{u(k)} = X_{u(k)}$ when the capacity is maximized, and the utility $U_{u(k)} = \log$ ($X_{u(k)}$) in terms of the PF. The utility change magnitude is used to calculate the scheduling metric value in the sector m in the serving cluster.

The controller determines one of the blank patterns of all cases and transmits the blank pattern determined through the interface. The blank pattern is determined semi-statically. Also, when receiving the blank pattern of the neighboring cluster or the blank data of some sectors from the other CU which controls the neighboring cluster, the controller transmits this to the sector m (see FIG. 2C).

The base station according to an exemplary embodiment of the present invention comprises a receiver, a transmitter, a controller, and a scheduler.

The transmitter encodes, modulates, and outputs data from the controller at a preset modulation level (MCS level). The transmitter outputs sample data (OFDM symbol) by applying Inverse Fast Fourier Transform to the modulated data, converts to a Radio Frequency (RF) signal by converting the sample data to an analog signal, and transmits through an antenna. For example, the transmitter transmits the channel information of the serving sector m and the neighboring sectors from the controller, to the CU.

The receiver outputs frequency-domain data by applying Fast Fourier Transform to the sample data which is output by converting the RF signal received through the antenna to a baseband analog signal. The receiver selects data of subcarriers to actually receive from the frequency-domain data, demodulates and decodes the selected data at the preset modulation level (MCS level), and outputs to the controller. For example, the receiver receives the blank pattern data per sector from the serving cluster and the neighboring clusters from the CU, and outputs to the controller.

The scheduler performs the predefined scheduling based on the blank pattern data per sector received from the serving cluster and the neighboring clusters and the utility change magnitude. For example, the base station of the sector m calculates the sum of the utility change magnitude (that is, the inter-cluster cooperation data received from the sector k) of the serving sectors (k=1, 2, ... ) when the sector m in the serving cluster is on/off based on Equation 3, and determines the scheduling metric value per user using the sum of the utility change magnitude of the neighboring sectors (k=1, 2, ... ) according to the blank pattern based on Equation 4.

The controller controls the overall base station operation, for example, performs resource allocation according to the scheduling result calculated through the scheduler.

As set forth above, by controlling to minimize the inter-cluster interference, the capacity reduction caused by the inter-cluster interference can be diminished.

While the invention has been shown and described with reference to certain exemplary embodiments thereof, it will be understood by those skilled in the art that various changes in form and details may be made therein without departing from the spirit and scope of the invention as defined by the appended claims and their equivalents.

What is claimed is:

1. A method for operating a central unit in a mobile communication system, the method comprising:

receiving first information regarding channels of a sector in a serving cluster and at least one sector in at least one neighboring cluster;

receiving second information regarding a change in an utility of the at least one sector due to a transition of the sector in the serving cluster from a blank state into a non-blank state; and determining a blank pattern of the sector in the serving cluster based on the first information and the second information,
wherein the utility is determined based on a ratio of a current data rate to an average data rate.

2. The method of claim 1, further comprising:
transmitting information on the blank pattern to the sector in the serving cluster.

3. The method of claim 1, further comprising:
receiving information on a blank pattern of another sector in the at least one neighboring cluster.

4. The method of claim 1, wherein the blank state is a state where data transmission is suspended during a corresponding transmission time interval (TTI).

5. A method for operating a base station in a mobile communication system, the method comprising:
transmitting, to a central unit, information regarding channels of a sector of the base station and at least one sector in at least one neighboring cluster;
receiving, from the central unit, information on a blank pattern; and
performing a scheduling based on the blank pattern,
wherein the blank pattern is determined based on the information regarding the channels and information regarding a change in an utility of the at least one sector of the base station due to a transition of the sector from a blank state into a non-blank state,
wherein the utility is determined based on a ratio of a current data rate to an average data rate.

6. The method of claim 5, wherein the blank state is a state where data transmission is suspended during a corresponding transmission time interval (TTI).

7. The method of claim 5, further comprising:
determining a magnitude of a change in an utility of the sector of the base station due to a transition of another sector in a neighboring cluster from a blank state into a non-blank state; and
transmitting information on the magnitude of the change to another central unit of the neighboring cluster.

8. The method of claim 5, wherein performing the scheduling comprises:
determining a sum of magnitudes of each change in an utility of the at least one sector; and
determining a scheduling metric by adding the current data rate of the sector in the non-blank state to the sum.

9. A central unit in a communication system, the central unit comprising:
an interface unit configured to:
receive first information regarding channels of a sector in a serving cluster and at least one sector in at least one neighboring cluster, and
receive second information regarding a change in an utility of the at least one sector due to a transition of the sector in the serving cluster base station from a blank state into a non-blank state; and
a controller configured to:
determine a blank pattern of the sector in the serving cluster based on the first information and the second information,
wherein the utility is determined based on a ratio of a current data rate to an average data rate.

10. The central unit of claim 9, wherein the interface unit is configured to transmit information on the blank pattern to the sector in the serving cluster.

11. The central unit of claim 9, wherein the interface unit is configured to receive information on a blank pattern of another sector in the at least one neighboring cluster.

12. The central unit of claim 9, wherein the blank state is a state where data transmission is suspended during a corresponding transmission time interval (TTI).

13. A base station in a mobile communication system, the base station comprising:
a transmitter configured to transmit, to a central unit, information regarding channels of a sector of the base station and at least one sector in at least one neighboring cluster;
a receiver configured to receive, from the central unit, information on a blank pattern; and
a scheduler configured to perform a scheduling based on the blank pattern,
wherein the blank pattern is determined based on the information regarding the channels and information regarding a change in an utility of the at least one sector due to a transition of the sector of the base station from a blank state into a non-blank state,
wherein the utility is determined based on a ratio of a current data rate to an average data rate.

14. The base station of claim 13, wherein the blank state is a state where data transmission is suspended during a corresponding transmission time interval (TTI).

15. The base station of claim 13, further comprising:
a controller configured to determine a magnitude of a change in an utility of the sector of the base station due to a transition of another sector in a neighboring cluster from a blank state into a non-blank state, and control to transmit information on the magnitude of the change to another central unit of the neighboring cluster.

16. The base station of claim 13, wherein the scheduler is configured to determine a sum of magnitudes of each change in an utility of the at least one sector, and determine a scheduling metric by adding the current data rate of the base station in the non-blank state to the sum.

* * * * *